UNITED STATES PATENT OFFICE.

LEO H. BAEKELAND, OF YONKERS, NEW YORK, ASSIGNOR TO GENERAL BAKELITE COMPANY, OF NEW YORK, N. Y., A CORPORATION OF NEW YORK.

PROCESS FOR MAKING INSOLUBLE BODIES DERIVED FROM PHENOL ALCOHOLS.

1,187,232.  Specification of Letters Patent.  Patented June 13, 1916.

No Drawing. Original application filed October 4, 1909, Serial No. 520,850. Divided and this application filed May 15, 1915. Serial No. 28,310

*To all whom it may concern:*

Be it known that I, LEO H. BAEKELAND, a citizen of the United States, residing at Yonkers, in the county of Westchester and State of New York, have invented certain new and useful Improvements in Processes for Making Insoluble Bodies Derived from Phenol Alcohols, of which the following is a specification.

It has been heretofore shown (see French Patent No. 350,180, British Patent No. 15,517 of 1905, and German Patent No. 189,262, to Fabriques de Produits de Chimie Organique de Laire) that phenol-alcohols, such for example as ortho-oxybenzyl alcohol (saligenin) and paraoxybenzyl alcohol, yield by elimination of water, resinous bodies or anhydrids which are soluble in alkaline solutions and in certain organic solvents, and which melt at 110° C., or above. I have also shown (see "On soluble, fusible, resinous condensation products of phenols and formaldehyde," L. H. Baekeland, *Journal of Industrial and Engineering Chemistry*, August, 1909), that similar products are obtained by heating phenol-alcohols in presence of a very small excess of phenol, the products thus obtained being characterized by great fusibility and solubility.

The present invention relates to the treatment of phenol-alcohols or their anhydrids to produce bodies in such condition as regards homogeneity and texture that they can be used for various technical purposes.

My process, as broadly described and claimed in my copending application Ser. No. 520,850, filed October 4, 1909, and which has matured into Patent #1,146,045, of which the present application is a division, consists in heating phenol-alcohols or their anhydrids, under pressure, for instance in a hot hydraulic press or mold, so as to obtain a hard coherent mass or molded body of great strength and hardness, which is infusible, and not soluble in or greatly affected by solvents or chemicals, and which can be used for several of the purposes for which ordinary plastics like hard rubber or celluloid have been employed heretofore.

According to the invention which is the subject-matter of the present divisional application, the preparation of such hard, coherent masses or molded articles is facilitated by the addition to the phenol-alcohols or their anhydrids, before hardening them under pressure, of so-called condensing-agents having a basic character. As illustrative examples of such condensing-agents, I may mention such basic substances as are described in my prior Patent No. 942,809, to wit, ammonia, anhydrous or aqueous, ammonium carbonate, caustic alkalis or their carbonates anilin or pyridin, the hydrates of barium, strontium, or calcium, etc. Amins and amids, and in general all derivatives of the type $NH_3$ which possess basic properties, may be used, as may also all basic salts, or salts which by secondary reaction engender bases, as for instance, alkali sulfids, acetates and cyanids, sodium triphosphate, borax, soaps, and the like.

The bases above referred to, and others having the requisite basic properties, are employed in variable proportions according to their character and also according to the result desired. Even when used in relatively vey small proportions they are effective for the purpose described.

Instead of using phenol-alcohols, or their anhydrids alone, it is very desirable to incorporate therewith suitable filling materials such for example as wood fiber, ground asbestos, lampblack and other pigments, or other substances which tend to improve the physical or chemical qualities of the final product. Such addition may be made at any time before the final treatment by heat and pressure.

Under the name of "phenol-alcohols," I desire to designate not only the first member of the group, oxybenzyl-alcohol, but the homologues or mixtures of these products as obtained by the suitable treatment of commercial phenols or cresols. The term "phenol-alcohols" is employed in the claims to include the partial anhydrids of such alcohols.

When the process is applied to the treatment of phenol-alcohols, these are dehydrated by cautious heating, for example in the manner described by De Laire, and the resulting resinous anhydrids, preferably pulverized, and mixed, if desired, with filling materials, are subjected to heat and a high degree of pressure in a mold or heated press untill the desired transformation has occurred. The molded products thus obtained are decidedly less hard and less resistant to heat and to solvents, than the products which are obtained by reacting upon the phenol-alcohols or their anhydrids with additional quantities of formaldehyde or its equivalents, as described in my Patent No. 1,038,475, dated September 10, 1912, and are not transformable into the latter class of products by simple heating under any conditions.

Instead of starting with the phenol-alcohols, I may of course prepare their anyhydrids by direct reaction of phenols and formaldehyde, alone or in presence of suitable condensing-agents, as for example by any of the methods described in my publication above referred to. In said publication, I have designated the anhydrids to the treatment of which the present invention relates under the general title of "soluble, fusible resinous condensation products of phenols and formaldehyde."

The term "anhydrids" is herein used to include both the partial and complete anhydrids of phenol-alcohols, or in general all dehydration products thereof, known also collectively as "saliretins," "shellac substitutes," etc., irrespective of the manner in which such anhydrids may have been prepared.

I claim:—

1. A process of making hard, compact and infusible bodies or molded articles, which consists in eliminating water from phenol-alcohols, and hardening the material by the action of heat and a pressure substantially above atmospheric pressure, in presence of a basic condensing-agent.

2. A process of making hard, compact and infusible bodies or molded articles, which consists in eliminating water from phenol-alcohols, and hardening the composition, in presence of suitable filling materials and of a basic condensing-agent, by the action of heat and a pressure substantially above atmospheric pressure.

3. In a process of making hard, compact and infusible bodies or molded articles, the step which consists in hardening anhydrids of phenol-alcohols by the action of heat and a pressure substantially above atmospheric pressure, and in presence of a basic condensing-agent.

4. In a process of making hard, compact, and infusible bodies or molded articles, the step which consists in hardening anhydrids of phenol-alcohols in presence of suitable filling materials and of a basic condensing-agent, by the action of heat and a pressure substantially above atmospheric pressure.

In testimony whereof I affix my signature in presence of two witnesses.

LEO H. BAEKELAND.

Witnesses:
 JOHN H. THOMAS,
 JOHN O. WESTON.